(12) United States Patent
Schreck et al.

(10) Patent No.: US 7,532,434 B1
(45) Date of Patent: May 12, 2009

(54) RECESSED WRITE POLE FOR PERPENDICULAR RECORDING

(76) Inventors: Erhard T. Schreck, 1098 Foxchase Dr., #379, San Jose, CA (US) 95123; Gang Herbert Lin, 1233 Mt. Quail Cir., San Jose, CA (US) 95120

( * ) Notice: Subject to any disclaimer, the term of this patent is extended or adjusted under 35 U.S.C. 154(b) by 147 days.

(21) Appl. No.: 10/237,252

(22) Filed: Sep. 6, 2002

Related U.S. Application Data

(60) Provisional application No. 60/317,799, filed on Sep. 6, 2001.

(51) Int. Cl.
*G11B 5/127* (2006.01)

(52) U.S. Cl. .................................................. 360/125.3

(58) Field of Classification Search ................ 360/317, 360/318, 126, 135, 125.46, 125.3; 369/13.14, 369/13.32, 300, 13.17
See application file for complete search history.

(56) References Cited

U.S. PATENT DOCUMENTS

| | | | |
|---|---|---|---|
| 4,839,761 A | 6/1989 | Gatzen | 360/103 |
| 5,073,836 A | 12/1991 | Gill et al. | 360/113 |
| 5,440,530 A * | 8/1995 | Fedeli et al. | 369/13.32 |
| 5,768,075 A * | 6/1998 | Bar-Gadda | 360/135 |
| 5,822,153 A * | 10/1998 | Lairson et al. | 360/234.7 |
| 5,909,340 A | 6/1999 | Lairson et al. | 360/104 |
| 6,156,375 A | 12/2000 | Hu et al. | 427/116 |
| 6,172,848 B1 * | 1/2001 | Santini | 360/125.46 |
| 6,404,706 B1 * | 6/2002 | Stovall et al. | 369/13.17 |
| 6,618,227 B2 * | 9/2003 | Yano et al. | 360/317 |
| 6,636,460 B2 * | 10/2003 | Akiyama et al. | 369/13.14 |
| 6,728,080 B2 * | 4/2004 | Ito et al. | 360/321 |
| 6,751,054 B2 * | 6/2004 | Sato et al. | 360/126 |
| 6,943,992 B2 * | 9/2005 | Lin | 360/317 |

FOREIGN PATENT DOCUMENTS

JP 05347008 A * 12/1993

* cited by examiner

*Primary Examiner*—Tianjie Chen
(74) *Attorney, Agent, or Firm*—Campbell Nelson Whipps LLC

(57) ABSTRACT

A disk drive having a head with a recessed write pole for perpendicular recording to a disk. The head also includes a read element, a first shield and a second shield that share a common plane, and the write pole is recessed relative to the plane, thereby reducing pole tip protrusion.

56 Claims, 6 Drawing Sheets

RECESSED WRITE POLE FOR PERPENDICULAR RECORDING

CROSS-REFERENCE TO RELATED APPLICATION

This application claims priority from U.S. Provisional Application Ser. No. 60/317,799 filed Sep. 6, 2001, which is incorporated by reference herein in its entirety.

FIELD OF THE INVENTION

The present invention relates to disk drives. More particularly, the present invention relates to a head with a write pole for perpendicular recording on a disk.

BACKGROUND OF THE INVENTION

Disk drives store information on magnetic disks. Typically, the information is stored in concentric tracks on the disk and the tracks are divided into servo sectors that store servo information and data sectors that store user data. A head reads from and writes to the disk. The head may include separate or integrated read and write elements. The head is mounted on an actuator arm that moves the head radially over the disk. Accordingly, the actuator arm allows the head to access different tracks on the disk. The disk is rotated by a spindle motor at a high speed, allowing the head to access different data sectors on the disk.

FIG. 1 illustrates a conventional disk drive 10 that includes a magnetic storage disk 12 that is rotated by a spindle motor 14. The spindle motor 14 is mounted on a base plate 16. The disk drive 10 also includes an actuator arm assembly 18 having a head 20 mounted on a flexure arm 22 which is attached to an actuator arm 24 that rotates about a bearing assembly 26 that is attached to the base plate 16. The actuator arm 24 cooperates with a voice coil motor 28 to move the head 20 relative to the disk 12. The spindle motor 14, the head 20 and the voice coil motor 28 are coupled to electronic circuits 30 mounted on a printed circuit board 32. The electronic circuits 30 include a read channel, a microprocessor-based controller and a random access memory (RAM). Although only a single disk 12 is shown, the disk drive 10 may include multiple disks 12 and therefore multiple corresponding actuator arm assemblies 18.

FIG. 2 illustrates the head 20 flying above the disk 12. The head 20 (which includes a slider and is conventional) is located above the disk surface 42 by a flying height 100. The flying height 100 is created by the interaction between air currents above the disk surface 42 (also known as an air-bearing) caused by rotation of the disk 12 and the aerodynamics of the slider of the head 20.

It is important to maintain the flying height 100. For example, if the head 20 flies too low, it is more likely to contact the disk 12 which could cause stored data to be lost. As another example, if the head 20 flies too low, a particle resting on the disk 12 may attach to the head 20 and change the aerodynamics of the head 20.

FIG. 3 is an air-bearing surface view of the head 20 that illustrates a write portion 110 of the head 20 and a read portion 120 of the head 20. For clarity, the slider of the head 20 is not shown. The write portion 110 includes a write pole 130 and a return 135. The read portion 120 includes a magneto-resistive (MR) read element 140 along with first and second shields 142, 144. The direction of disk rotation is shown by arrow 150 such that the write pole 130 follows the read element 140.

FIG. 4 is a cross-sectional, side view of the head 20 that illustrates a write coil 155, a write gap 160 and a read gap 165. The write portion 110 writes perpendicular magnetic polarity transitions onto the disk 12. Perpendicular recording is well-known in the art and requires a disk that is capable of having perpendicular magnetic polarity transitions recorded thereon, for example, by including a soft magnetic underlayer.

During a write operation, a variable write current is supplied to the write coil 155 to induce magnetic flux across the write gap 160. The direction of the write current defines the direction in which the magnetic flux is oriented across the write gap 160. In simple recording systems, magnetic flux polarized in one direction across the write gap 160 records a binary one while magnetic flux polarized in the opposite direction records a binary zero. In most recording systems, a change in the direction that the magnetic flux travels across the write gap 160 records a binary one while the lack of such change records a binary zero. As the disk 12 travels under the write portion 110, a series of ones and zeros are written to the disk 12.

During a read operation, the first and second shields 142, 144 define the read gap 165 which focuses the magnetic flux for a particular magnetic polarity transition onto the read element 140 by shielding the read element 140 from other sources of magnetic flux. In other words, extraneous magnetic flux is filtered away from the read element 140 by the shields 142, 144. The read element 140 generates a read signal in response to the changing magnetic flux which corresponds to previously recorded data as magnetic polarity transitions in the disk 12 pass underneath it.

The write portion 110 and the read portion 120 are located near the trailing edge of the head 20. Furthermore, the head 20 is pitched relative to the disk 12 such that the trailing edge is closest to the disk 12 (see FIG. 2). Since the write portion 110 trails the read portion 120, the write portion 110 (specifically the write pole 130) is closest to the disk 12. In addition, the write pole 130, the return 135, the read element 140, the first shield 142 and the second shield 144 share a common plane 175 at an air-bearing surface which faces the disk 12.

Disk drives usually store information on disks using longitudinal recording as opposed to perpendicular recording. However, the heads associated with longitudinal recording may be very similar to the head 20 in that the write pole, return, read element, first shield and second shield share a common plane.

When a write current is introduced into the write coil 155, the write portion 110 thermally expands and is brought even closer to the disk 12. This phenomenon is known as pole tip protrusion. Failure to accommodate pole tip protrusion can result in serious consequences, including data loss where the write portion 110 contacts the disk 12.

Accordingly, it would be advantageous to provide a head which reduces pole tip protrusion, while still allowing data to be accurately recorded onto the disk.

SUMMARY OF THE INVENTION

The present invention minimizes the aforementioned problems and meets the aforementioned and other needs.

The present invention is directed to a disk drive having head with a recessed write pole for perpendicular recording to a disk. The head also includes a read element, a first shield and a second shield that share a common plane. The write pole is recessed relative to the plane, thereby reducing pole tip protrusion.

Other objects, features, embodiments and advantages of the invention will be apparent from the following description taken in conjunction with the drawings.

DETAILED DESCRIPTION OF THE PREFERRED EMBODIMENTS

Write field components associated with perpendicular recording decay at a much lower rate than write field components associated with longitudinal recording. In fact, when operating the write pole in its saturated region, write fields generated by the write pole are insensitive to magnetic spacing with perpendicular recording.

The present invention provides a head for perpendicular recording in which the write pole is recessed relative to the read element. This allows more clearance between the write pole and the disk. Thus, the potential for the head contacting the disk due to pole tip protrusion is reduced or eliminated.

Figure 1:
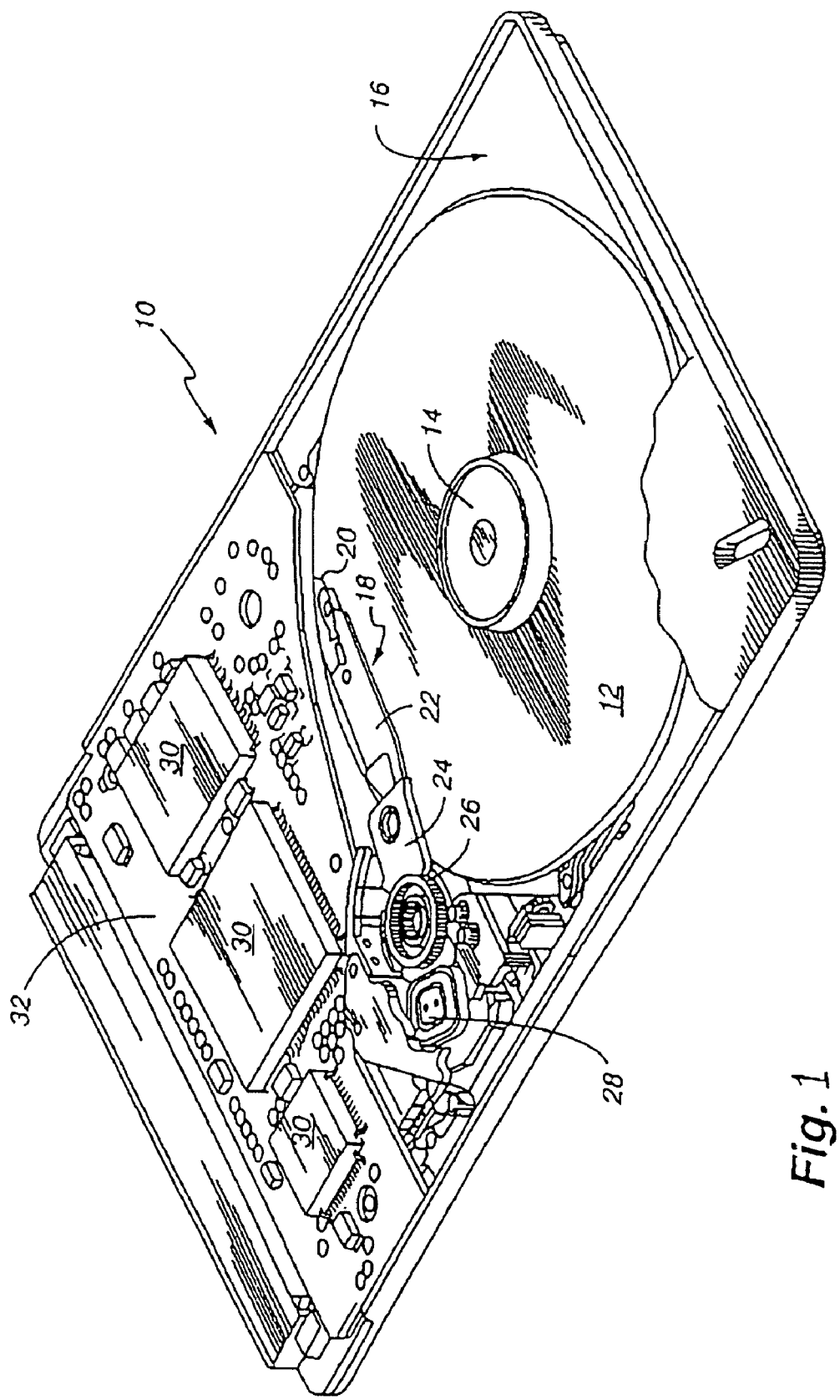
FIG. 1 is a diagrammatic representation of a conventional disk drive.
Figure 2:
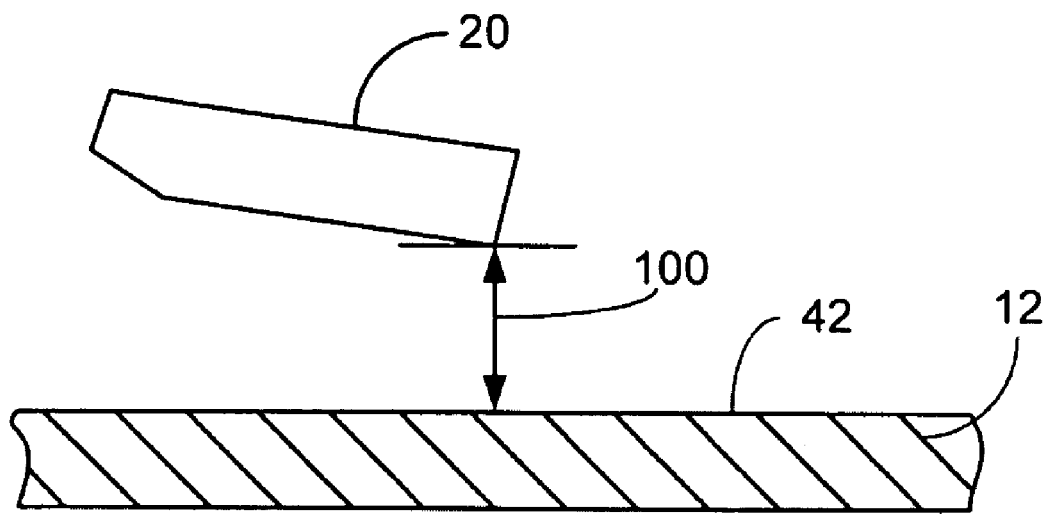
FIG. 2 is a sectional view of a conventional head flying above a disk.
Figure 3:
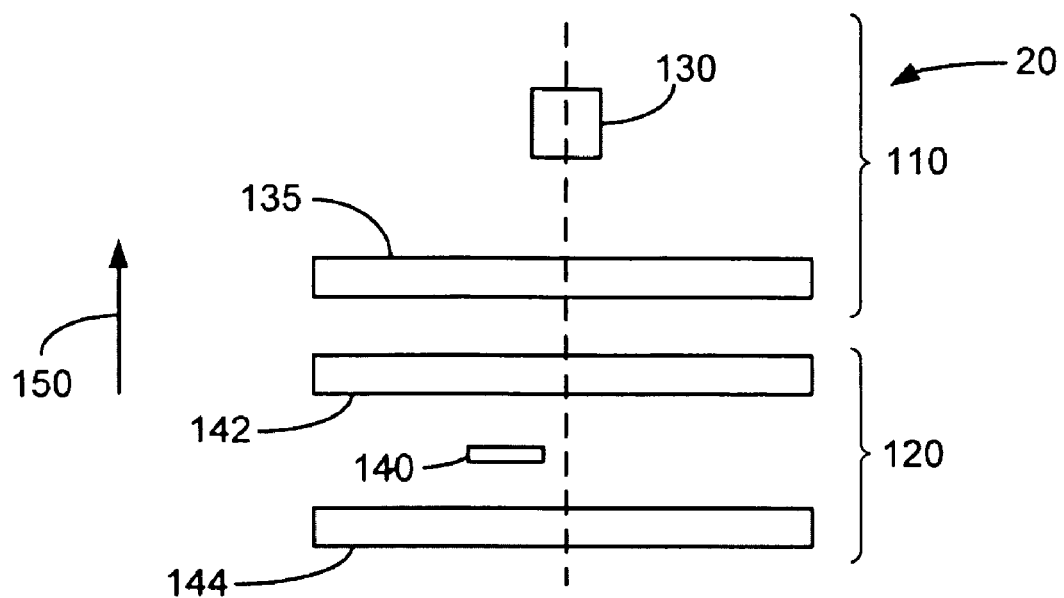
FIG. 3 is an air-bearing surface view of the conventional head having a write portion and a read portion.
Figure 4:
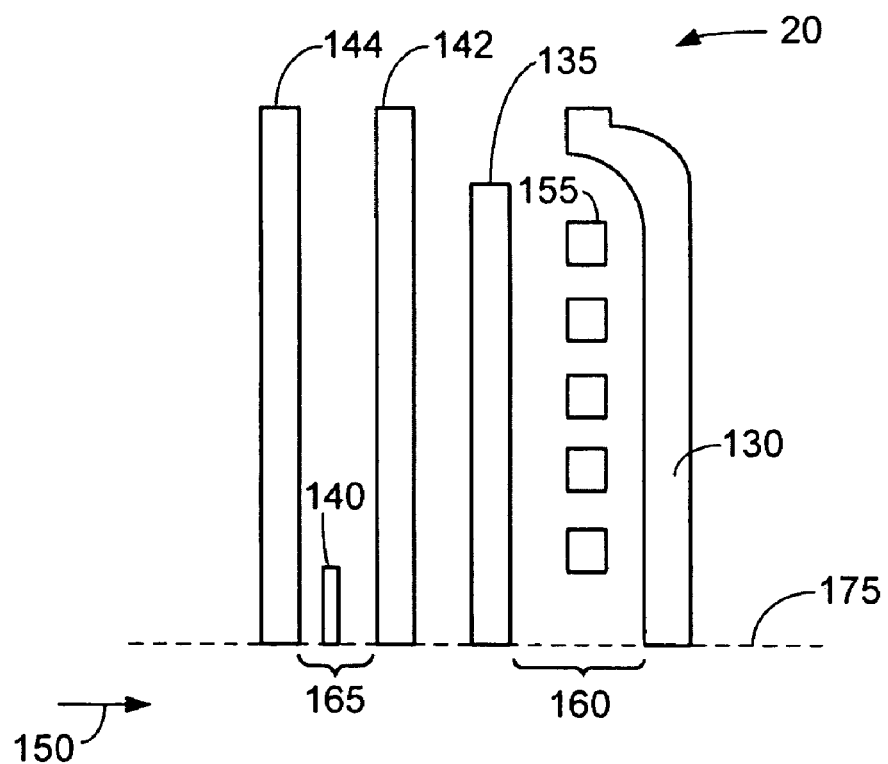
FIG. 4 is a cross-sectional, side view of the conventional head.
Figure 5:
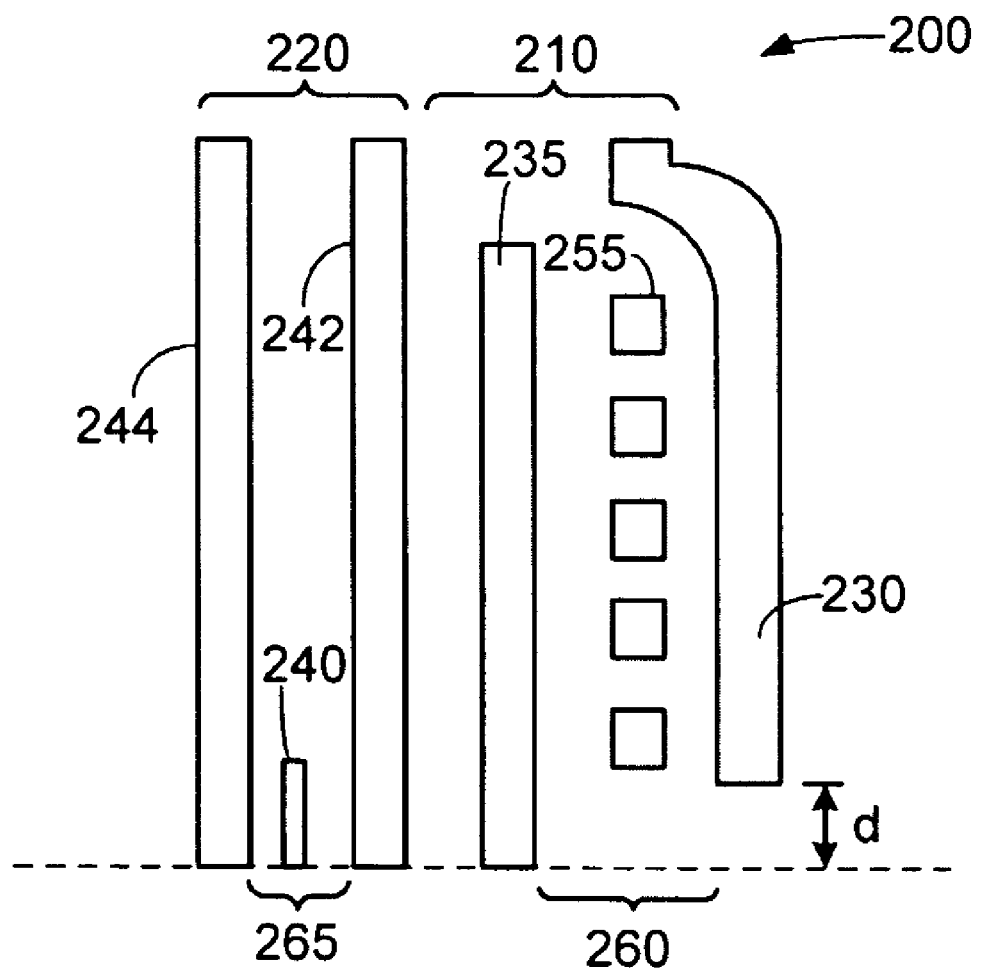
FIG. 5 is a cross-sectional, side view of a head in accordance with the present invention.

FIG. 5 is a cross-sectional, side view of a head 200 in accordance with the present invention. The head 200 includes a write portion 210 and a read portion 220. The write portion 210 includes a write pole 230, a return 235 and a write coil 255. The read portion 220 includes a read element 240, a first shield 242 and a second shield 244.

The write pole 230 is recessed by a distance (d) relative to a plane formed by the return 235, the read element 240, the first shield 242 and the second shield 244. When the write portion 210 expands upon the introduction of a write current into the write coil 255, it is more difficult for the write pole 230 to contact the disk 12 because of the increased clearance between the write pole 230 and the disk 12. Thus, pole tip protrusion is reduced.

The distance (d) can be any value which permits an adequate amount of magnetic flux to be provided to the disk 12 to allow information to be recorded thereon, and can depend on the coercivity of the disk 12, the write current, the number of turns of the write coil 255 and/or the surface area of that portion of the write pole 230 which faces the disk 12, among other things. Preferably, the distance (d) is greater than 1 nm and less than 12 nm. Even more preferably, the distance (d) is greater than 2 nm and less than 10 nm. Yet more preferably, the distance (d) is about 5 nm.

Figure 6:
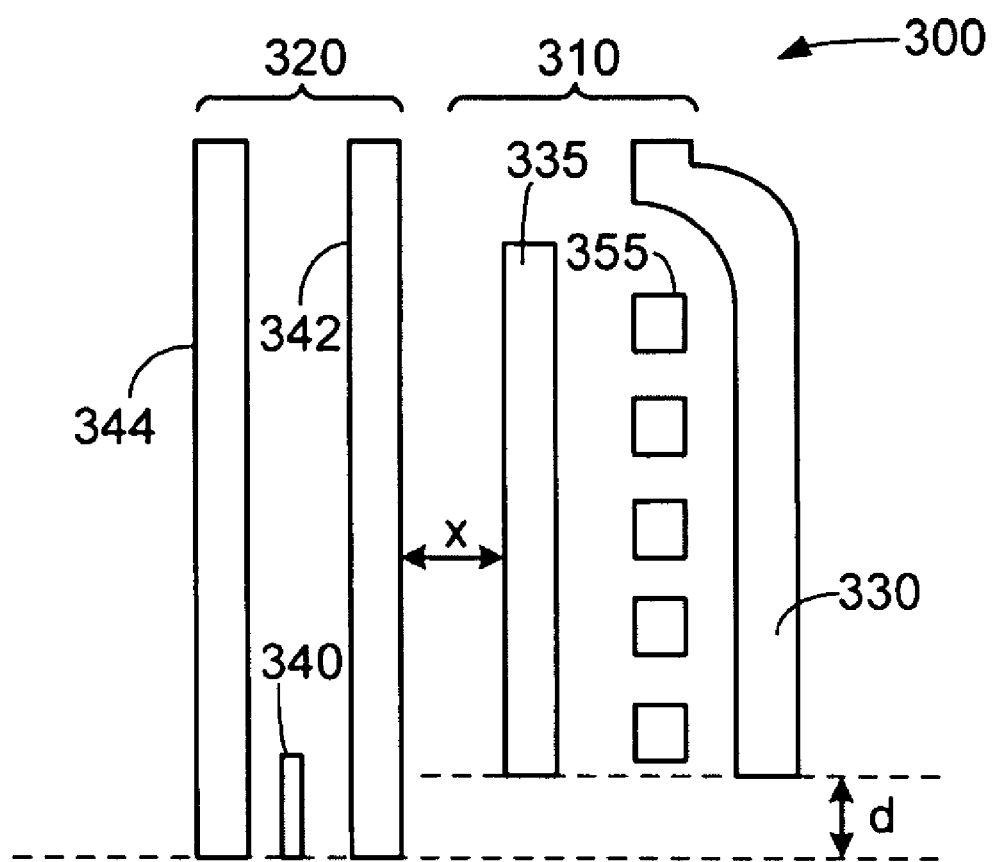
FIG. 6 is a cross-sectional, side view of a head in accordance with the present invention.

FIG. 6 is a cross-sectional, side view of a head 300 in accordance with the present invention. The head 300 includes a write portion 310 and a read portion 320. The write portion 310 includes a write pole 330, a return 335 and a write coil 355. The read portion 320 includes a read element 340, a first shield 342 and a second shield 344.

The write pole 330 and the return 335 are recessed by the distance (d) relative to a plane formed by the read element 340, the first shield 342 and the second shield 344. When the write portion 310 expands upon the introduction of a write current into the write coil 355, it is more difficult for the write pole 330 and the return 335 to contact the disk 12 because of the increased clearance between the write pole 330 and the disk 12 and between the return 335 and the disk 12. Thus, pole tip protrusion is reduced.

Furthermore, the write portion 310 is separated from the read portion 320 by a distance (x). The distance (x) is preferably at least 2 microns and less than 22 microns. More preferably, the distance (x) is at least 4 microns and less than 20 microns. The distance (x) ensures that the process of recessing the write portion 310 does not affect the read portion 320.

Although the return 335 is recessed by the distance (d), it can be recessed by a distance that is greater than or less than the distance (d). In addition, the write coil 355 can be recessed in conjunction with the return 335. In addition, the turns of the write coil (255 or 355) can be spread out relative to one another and additional turns can be added to increase the magnetic flux from the write pole (230 or 330).

The write pole (and other elements) can be recessed by many techniques known to those in the art, such as etching or ion milling. Accordingly, such techniques will not be described herein.

In conventional head manufacturing, lapping sets the resistance of the MR read elements. During lapping, material is removed from the MR read element and other portions of the head in a generally planar fashion. In the present invention, the write pole can be recessed relative to the plane formed by lapping, for instance by etching or ion milling.

The present invention is applicable to disk drives with heat-activated recording. In this technique, the disk has high coercivity and a large magnetic field is required to write information to the disk. By using a heat source (e.g., a laser) to introduce heat at a target location on the disk (e.g., bring the target location up to its Curie point), the coercivity is effectively reduced (or softened) so that a smaller magnetic field can write information to the disk. A head having a recessed write pole in accordance with the present invention can apply such a magnetic field.

For example, a light source can be placed in each head of the disk drive and use the optical nearfield effect, which allows light to be focused below its wavelength. The light source can include a conical light guide integrated into the head with its tip pointed towards the air-bearing surface interface. As another example, a bow-tie antenna in the head can couple energy to the interface.

Figure 7:
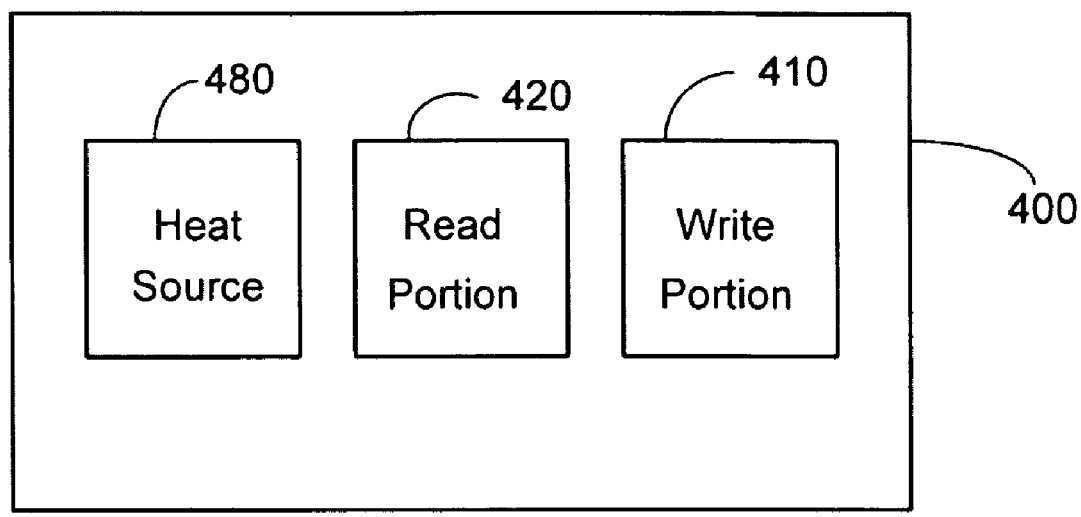
FIG. 7 is a block diagram of a head having a write portion, a read portion and a heat source for heat-activated recording in accordance with the present invention.

FIG. 7 illustrates a head 400 having a write portion 410, a read portion 420 and a heat source 480 for performing heat-activated recording in accordance with the present invention. The write portion 410 includes a recessed write pole (not shown) as described above. In addition, the heat source 480 can be positioned relative to the write portion 410 and the read portion 420 in other ways than shown.

While an effort has been made to describe some alternatives to the preferred embodiments, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A disk drive comprising:
   a disk having a disk surface for storing information thereon;
   a head for writing information onto the disk surface using a write pole, wherein the head includes a magnetoresistive read element, a first shield and a second shield that lie in a plane, wherein said write pole is recessed by a distance (d) relative to said plane, and wherein the distance (d) is greater than 1 nm and less than 12 nm; and
   a heat source associated with said head for performing heat-activated recording of information onto the disk surface.

2. The disk drive of claim 1, wherein the distance (d) is greater than 2 nm and less than 10 nm.

3. The disk drive of claim 2, wherein the distance (d) is about 5 nm.

4. The disk drive of claim 1, wherein the head includes a return associated with the write pole and wherein the return is recessed relative to said plane.

5. A transducer comprising:
   a head for writing information using a write pole, wherein the head includes a magnetoresistive read element, a first magnetic flux shield and a second magnetic flux shield that lie in a plane, wherein said write pole is recessed by a distance (d) relative to said plane, wherein the head includes a return associated with the write pole; and
   a heat source associated with said head for performing heat-activated recording of information onto a disk surface.

6. The transducer of claim 5, wherein the return is recessed relative to said plane by a distance different from the distance (d).

7. The transducer of claim 5, wherein the head includes a write coil associated with the write pole and wherein said write coil is recessed relative to said plane.

8. The transducer of claim 5, wherein the first magnetic flux shield is positioned closer to the return as compared to the second magnetic flux shield, and wherein the first magnetic flux shield and the return are separated by a distance (x).

9. The transducer of claim 8, wherein the distance (x) is at least 2 microns and less than 22 microns.

10. The transducer of claim 9, wherein the distance (x) is at least 4 microns and less than 20 microns.

11. The transducer of claim 5, wherein the distance (d) is greater than 1 nm and less than 12 nm.

12. The transducer of claim 11, wherein the distance (d) is greater than 2 nm and less than 10 nm.

13. The transducer of claim 12, wherein the distance (d) is about 5 nm.

14. A disk drive comprising:
   a disk having a disk surface for storing information thereon; and,
   a head which flies above said disk surface and which writes information onto the disk surface using a write pole that is spaced a first distance from the disk surface, wherein the head includes a magnetoresistive read element spaced a second distance from the disk surface, wherein the first distance is greater than the second distance, and wherein the difference between the first distance and the second distance is greater than 1 nm and less than 12 nm, and the head includes a return associated with the write pole and the return is spaced a third distance from the disk surface and the second distance and the third distance are different from one another.

15. The disk drive of claim 14, wherein the difference between the first distance and the second distance is greater than 2 nm and less than 10 nm.

16. The disk drive of claim 15, wherein the difference between the first distance and the second distance is about 5 nm.

17. The disk drive of claim 14, further including a heat source associated with said head for performing heat-activated recording of information onto the disk surface.

18. A sensor comprising:
   a head for writing information using a write pole, wherein the head includes a magnetoresistive read element having a surface which lies in a plane, wherein said write pole is recessed by a distance (d) relative to said plane; and
   a heat source associated with said head for performing heat-activated recording of information onto a disk surface.

19. The sensor of claim 18, wherein the distance (d) is greater than 2 nm and less than 10 nm.

20. The sensor of claim 19, wherein the distance (d) is about 5 nm.

21. The sensor of claim 18, wherein the head includes a return associated with the write pole and wherein the return is recessed relative to said plane.

22. A transducer comprising:
   a head for writing information using a write pole, wherein the head includes a magnetoresistive read element having a surface which lies in a plane, wherein said write pole is recessed by a distance (d) relative to said plane, wherein the head includes a return associated with the write pole; and
   a heat source associated with said head for performing heat-activated recording of information onto a disk surface.

23. The sensor of claim 22, wherein the return is recessed relative to said plane by a distance different from the distance (d).

24. The sensor of claim 22, wherein the head includes a write coil associated with the write pole and wherein said write coil is recessed relative to said plane.

25. A disk drive comprising:
   a disk having a disk surface for storing information thereon; and,
   a head for writing information onto the disk surface using a write pole, said head being manufactured using a lapping process, wherein the head includes a magnetoresistive read element lying in a plane formed upon completion of the lapping process, wherein said write pole is recessed by a distance (d) relative to said plane, and wherein the distance (d) is greater than 1 nm and less than 12 nm; and
   a heat source associated with said head for performing heat-activated recording of information onto the disk surface.

26. The disk drive of claim 25, wherein the distance (d) is greater than 2 nm and less than 10 nm.

27. The disk drive of claim 26, wherein the distance (d) is about 5 nm.

28. The disk drive of claim 25, wherein the head includes a return associated with the write pole and wherein the return is recessed relative to said plane.

29. A disk drive comprising:
   a disk having a disk surface for storing information thereon; and,
   a head for writing information onto the disk surface using a write pole, said head being manufactured using a lapping process, wherein the head includes a magnetoresistive read element lying in a plane formed upon completion of the lapping process, wherein said write pole is recessed by a distance (d) relative to said plane, wherein the head includes a return associated with the write pole; and a heat source associated with said head for performing heat-activated recording of information onto the disk surface.

30. The disk drive of claim 29, wherein the return is recessed relative to said plane by a distance different from the distance (d).

31. The disk drive of claim 29, wherein the head includes a write coil associated with the write pole and wherein said write coil is recessed relative to said plane.

32. A sensor comprising:
a head for writing information using a write pole, wherein the head includes a magnetoresistive read element, a first shield and a second shield that lie in a plane and wherein no portion of said write pole lies within said plane; and
a heat source associated with said head for performing heat-activated recording of information onto a disk surface.

33. The sensor of claim 32, wherein the head includes a return associated with the write pole.

34. The sensor of claim 33, wherein the first shield is positioned closer to the return as compared to the second shield, and wherein the first shield and the return are separated by a distance (x).

35. The sensor of claim 34, wherein the distance (x) is at least 2 microns and less than 22 microns.

36. The sensor of claim 35, wherein the distance (x) is at least 4 microns and less than 20 microns.

37. A disk drive comprising:
a recording disk; and,
a head for reading information from and writing information to the disk, wherein the head includes a read portion and a write portion, the read portion includes a magnetoresistive read element, a first shield and a second shield, the write portion includes a write pole, a write coil and a return, the read element, the first shield and the second shield lie in a plane at an air-bearing surface which faces the disk, the write pole is recessed by a distance (d) relative to the plane and the distance (d) is greater than 1 nm and less than 12 nm; and
a heat source associated with said head for performing heat-activated recording of information onto the disk surface.

38. The disk drive of claim 37, wherein the distance (d) is greater than 2 nm and less than 10 nm.

39. The disk drive of claim 38, wherein the distance (d) is about 5 nm.

40. The disk drive of claim 37, wherein the write coil is recessed relative to the plane.

41. The disk drive of claim 37, wherein the return is recessed relative to the plane.

42. The disk drive of claim 41, wherein the return is recessed relative to the plane by the distance (d).

43. The disk drive of claim 41, wherein the return is recessed relative to the plane by greater than the distance (d).

44. The disk drive of claim 41, wherein the return is recessed relative to the plane by less than the distance (d).

45. The disk drive of claim 37, wherein the write portion expands towards the disk upon introduction of a write current into the write coil.

46. The disk drive of claim 37, wherein the write pole is recessed relative to the plane due to etching or ion milling.

47. A disk drive comprising:
a recording disk; and,
a head for reading information from and writing information to the disk, wherein the head includes a read portion and a write portion, the read portion includes a magnetoresistive read element, a first shield and a second shield, the write portion includes a write pole, a write coil and a return, the read element, the first shield and the second shield lie in a plane at an airbearing surface which faces the disk, and the write pole and the return are recessed by a distance (d) relative to the plane; and
a heat source associated with said head for performing heat-activated recording of information onto the disk surface.

48. The disk drive of claim 47, wherein the distance (d) is greater than 2 nm and less than 10 nm.

49. The disk drive of claim 47, wherein the write coil is recessed relative to the plane.

50. The disk drive of claim 47, wherein the write portion expands towards the disk upon introduction of a write current into the write coil.

51. The disk drive of claim 47, wherein the write pole and the return are recessed relative to the plane due to etching or ion milling.

52. A disk drive comprising:
a recording disk; and,
a head for reading information from and writing information to the disk, wherein the head includes a read portion and a write portion, the read portion includes a magnetoresistive read element, a first shield and a second shield, the write portion includes a write pole, a write coil and a return, the read element, the first shield and the second shield lie in a plane at an airbearing surface which faces the disk, the write pole and the return are recessed by a distance (d) relative to the plane and the distance (d) is greater than 1 nm and less than 12 nm, thereby reducing pole tip protrusion in the head due to the write pole and the return being recessed relative to the plane; and
a heat source associated with said head for performing heat-activated recording of information onto the disk surface.

53. The disk drive of claim 52, wherein the distance (d) is greater than 2 nm and less than 10 nm.

54. The disk drive of claim 52, wherein the write coil is recessed relative to the plane.

55. The disk drive of claim 52, wherein the write portion expands towards the disk upon introduction of a write current into the write coil.

56. The disk drive of claim 52, wherein the write pole and the return are recessed relative to the plane due to etching or ion milling.

* * * * *